Sept. 27, 1966  TADASHI KASAHARA  3,274,912
SINGLE-LENS REFLEX CAMERA
Filed Feb. 27, 1962  3 Sheets-Sheet 1

Tadashi Kasahara,
Inventor
By Wenderoth, Lind
and Ponack, Attorneys

Sept. 27, 1966  TADASHI KASAHARA  3,274,912
SINGLE-LENS REFLEX CAMERA
Filed Feb. 27, 1962  3 Sheets-Sheet 2

Tadashi Kasahara
Inventor
By Wenderoth, Lind
and Ponack, attorneys

Sept. 27, 1966 TADASHI KASAHARA 3,274,912
SINGLE-LENS REFLEX CAMERA
Filed Feb. 27, 1962 3 Sheets-Sheet 3

Tadashi Kasahara,
Inventor
By Wenderoth, Lind
and Ponack, Attorneys

United States Patent Office 3,274,912
Patented Sept. 27, 1966

3,274,912
SINGLE-LENS REFLEX CAMERA
Tadashi Kasahara, Tokyo, Japan, assignor to Konishiroku Shashin Kogyo Kabushiki-Kaisha, Tokyo, Japan, a corporation of Japan
Filed Feb. 27, 1962, Ser. No. 176,027
Claims priority, application Japan, Mar. 1, 1961, 36/6,748
6 Claims. (Cl. 95—44)

This invention relates to a single-lens reflex camera wherein two small reflectors are spaced from an optical axis and sandwiched between two glass blocks which form an integral transparent panel on the object side of a diaphragm within a photographic lens so that a small portion of the light which is being directed to the film can be diverted to a finder optical system and are directed to a focusing panel having a group of planes located in a real image plane within a finder and inclined in only two specific directions corresponding to the positions of said two small reflectors, so that an image equivalent to the image focused on the surface of a photosensitive material may be observed within the field of vision of the finder and at the same time precise focusing is made possible.

Figure 1A:
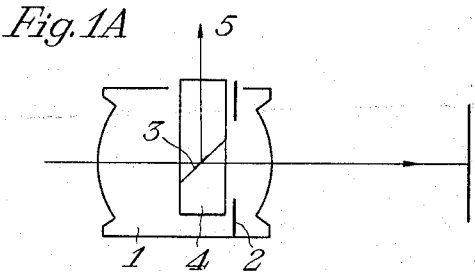
FIGURE 1A is a schematic side view showing a kind of optical system for a known single-lens reflex camera.
Figure 1B:
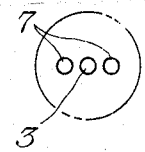
FIGURE 1B is a schematic elevation of its light separating prism.

Now, there is in the prior art an optical system for a single-lens reflex camera wherein, as shown in FIGURE 1A, a light separating prism 4 in which is embedded a small reflector 3 whose projected figure in a plane perpendicular to the optical axis is much smaller than the maximum aperture of the photographing lens is arranged in a space on the object side of and very close to a diaphragm 2 within or just behind a photographic lens 1 so that a slight portion of the light being directed to the film is diverted along a light path 5 to a finder. The image diverted, by said reflector 3 may be focused on a pupil behind the finder by the optical system forming the finder and thus a very bright finder field of vision may be obtained substantially without losing the brightness on a photographed picture surface 6. It is also known that, in such case, as shown in FIGURE 1B, one reflector 3 is arranged on the optical axis, two reflectors 7 are arranged symmetrically to the optical axis and said two reflectors 7 located outside the optical axis and a so-called ranging wedge focusing means located in a real image plane within the finder system are used to provide a range finding action.

Generally, in a lens in which the influence of the diffraction of light on the focusing performance is small as in a photographic lens, even if an obstacle is inserted on the surface of the diaphragm of the lens so as to interrupt a part of the light passing through the lens, the final image will not be influenced at all. Therefore, the image photographed by being focused by the above-mentioned system will not be inferior to the one photographed with a lens with no reflector associated with it. However, in a photographic lens, all the objects to be photographed will not be always correctly focused on the film surface. Therefore, in discussing the character of a photographic lens, the so-called blur (out-of-focus effect) will have an important significance.

Figure 2A:
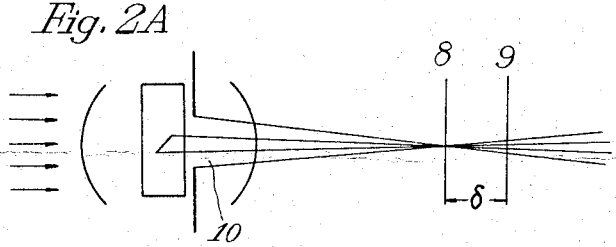
FIGURE 2A is a side view showing the distribution of light when the diaphragm of a photographing lens is made small in said optical system.
Figure 2B:
FIGURE 2B is a view showing the distribution of light on a surface at right angles to the optical axis a little behind the focal plane in the above-mentioned case.

In considering the above-mentioned optical system in this respect, as the small reflector corresponding to the observing pupil usually has a sufficiently smaller area than the maximum opening of the photographic lens, in case the diaphragm of the photographing lens is opened, it will have an effect on the blurring of the image which is not different from that of an ordinary lens. However, in case the diaphragm of the photographing lens is made small, for example, when the diameter of the opening of the diaphragm is about 1.5 to 3 times as large as the diameter of the small reflector arranged on the central optical axis as shown in FIGURE 2A, the so-called blurring will vary greatly. That is to say, as the distribution of light within a confusion circle in an image plane 9 displaced by $\delta$ from the focal plane 8 is geometrically similar to the distribution of the light transmittance in the diaphragm plane 10, a blurred circle such as is shown in FIGURE 2B will be made. In such case, the contrast transfer function controlling the image produced thereby will have a remarkable negative value in a specific space frequency range, a strong spurious resolution will be caused and, for example, an unpleasant state in which one line appears to be two will be brought about. Further, as the small reflector arranged on the optical axis is diagonal to the optical axis or is set at some distance from the diaphragm, when the opening of the diaphragm is a minimum, the brightness of the photographed picture is very likely to become irregular.

The present invention has as an object the provision of a photographing lens system in a single lens reflex camera which produces an effect no different from that of an ordinary photographic lens. For this purpose, it is intended to feed light to the finder system by only two small reflectors spaced some distance from the optical axis by eliminating the small reflector on the optical axis.

Figure 3:
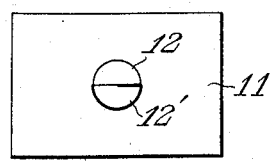
FIGURE 3 is a view showing a finder field of vision of the optical system of a known single-lens reflex camera.

Now, the known optical system in which three small reflectors are used usually has a finder field of vision such as is shown in FIGURE 3. The part 11 within the field of vision will be illuminated by the light reflected from the small reflector arranged on the optical axis of the photographic lens and the parts 12 and 12' within the field of vision will be respectively illuminated by the two small reflectors arranged in the positions spaced from the optical axis. Therefore, in case the small reflector on the optical axis is removed, the part 11 of the field of vision will not be illuminated. Then, a focusing panel having a structure such as is exemplified in FIGURES 4A to 8C may be used.

Figure 4A:
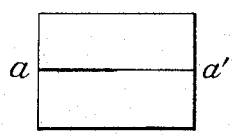
FIGURE 4A is an elevation of a focusing panel which can be used in the present invention but is known.
Figure 4B:
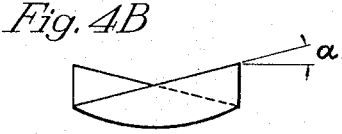
FIGURE 4B is a bottom view of the same.

In the focusing panel shown in FIGURES 4A and 4B, the structure of a so-called ranging wedge focusing means is expanded to all the field of vision. When it is used, the whole field of vision will be naturally able to be observed brightly and range finding will be able to be made at all the points on the boundary line a–a' of the two wedges. However, if the angle of the field of vision stretched to the horizontal direction of the picture stretched to the pupil of the observer is too large, when the observing pupil is displaced to right or left, a difference between the magnifications of the upper and lower images will occur and will cause a focusing error. Therefore, such a focusing panel is not adapted to an optical system in which the angle of the finder field of vision is relatively large.

Figure 5A:
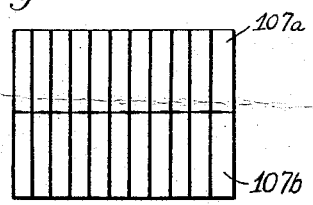
FIGURE 5A is an elevation of a different focusing panel which can be used in the present invention.
Figure 5B:
FIGURE 5B is a bottom view of the same.

FIGURES 5A and 5B show the structure of a focusing panel in which the defect of the above-mentioned known focusing panel is eliminated. The panel, which is on the side of the eyepiece 107 opposite the viewing side, has two wedge sections, an upper section 107a and a lower section 107b. Each section has a plurality of wedges 107a' and 107b' thereon with the inclined faces on the wedges 107a' on the upper section inclined in the opposite direction to the faces on the wedges 107b' on the lower section. If the wedge angle is $\alpha$ and the pitch of the wedges is P, when P tan $\alpha$ is selected to be smaller than the allowable depth of focus in the real image plane of the finder system and the focusing panel is combined with the optical system of the subject matter of the present invention, the function like that of an upper and lower image coinciding type range finder will be able to be obtained on the whole field of vision.

Figure 6A:
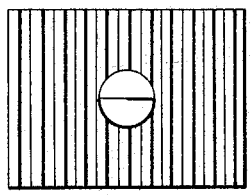
FIGURE 6A is an elevation of a further focusing panel which can also be used in the present invention.
Figure 6B:
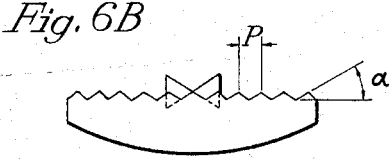
FIGURE 6B is a bottom view of the same.

In the focusing panel shown in FIGURES 6A and 6B, a so-called ranging wedge focusing means is arranged on the back of the eyepiece in the central part of the field of vision so as to provide a structure of an upper and lower image coinciding type range finder. The remainder of the back of the panel has triangular projections 107c the sides of which have an inclination $\alpha$ corresponding to the positions of the small reflectors, so that the whole of field of vision may be seen brightly. In such case, the pitch P of the triangular projections must be so selected that P/2 tan $\alpha$ is smaller than the allowable depth of focus in the real image plane of the finder. In the focusing panel of the structure shown in this drawing, the upper and lower image coinciding type range finding can be performed in the central part and at the same time auxiliary focusing can be performed in the remainder of the panel.

In the focusing panel of the structure shown in FIGURE 6A and 6B, so many vertical structural lines are arranged in the greater part of the field of vision that unpleasant feeling in the observation will be unavoidable and the brightness of the image will be reduced.

Figure 7A:
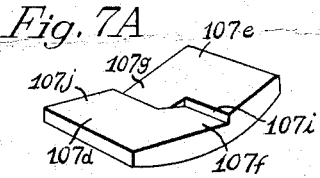
FIGURE 7A is a perspective view of a further focusing panel which can also be used the same as in the above.
Figure 7B:
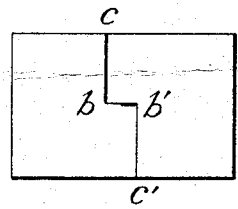
FIGURE 7B is an elevation of the same.
Figure 7C:
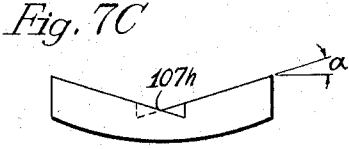
FIGURE 7C is a bottom view of the same.

The focusing panels shown in FIGURES 7A to 8C have structure for eliminating said defect. In the focusing panel shown in FIGURES 7A–7C, there is a first inclined portion 107d and an oppositely inclined portion 107e which are inclined at equal angles toward each other toward an imaginary line of intersection 107h. The first inclined portion has an extension 107f extending past the imaginary line of intersection into the oppositely inclined portion 107e, and the other inclined portion 107e has a similar extension 107g extending past the imaginary line of intersection into the oppositely inclined portion 107d. In the embodiment of FIGS. 7A–7C the surfaces between the ends of the intersections 107f and 107g and the respective incline portions 107e and 107d into which they extend are flat and parallel to the imaginary line of intersection 107h. With this focusing panel, the upper and lower image coinciding range finding is carried out on the boundary b–b' where edges of extensions 107f and 107g cross, the range finding by observing a linear object inclined by 45 degrees is carried out in the parts of the boundaries b–c and b'–c' along surfaces 107i and 107j, and a very bright beautiful image can be seen even in the other part of the field of vision with only two small reflectors.

Figure 8A:
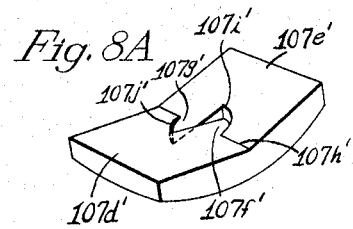
FIGURE 8A is a perspective view of a still further focusing panel which can also be used the same as in the above.
Figure 8B:
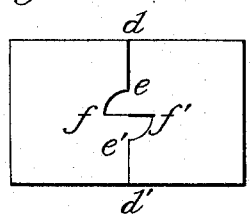
FIGURE 8B is an elevation of the same.
Figure 8C:
FIGURE 8C is a bottom view of the same.

The focusing panel shown in FIGURES 8A to 8C is of substantially the same construction as is described above. In this focusing panel, there are inclined portions 107d' and 107e' similar to those of FIGS. 7A–7C, which intersect at line of intersection 107h'. These inclined portions have extensions 107f' and 107g' similar to those of FIGS. 7A–7C, but they are quadrant shaped extensions with the straight edges adjacent each other, and curved surfaces 107i' and 107j' between the ends of the extensions and the inclined portions 107e' and 107d'. With this focusing panel, the range finding using a linear object inclined by 45 degrees is carried out in the part of the boundaries d–e and d'–e' along line 107h' and the upper and lower image coinciding type range finding is carried out on the boundary f—f where edges of extensions 107f' and 107g' cross.

It is evident that, in any case, if a focusing panel formed of a group of planes incline in a specific direction determined by the two small reflectors is used, the whole field of vision will be able to be observed and the precise range finding will be able to be made by the optical system of the subject matter of the present invention.

Figure 9A:
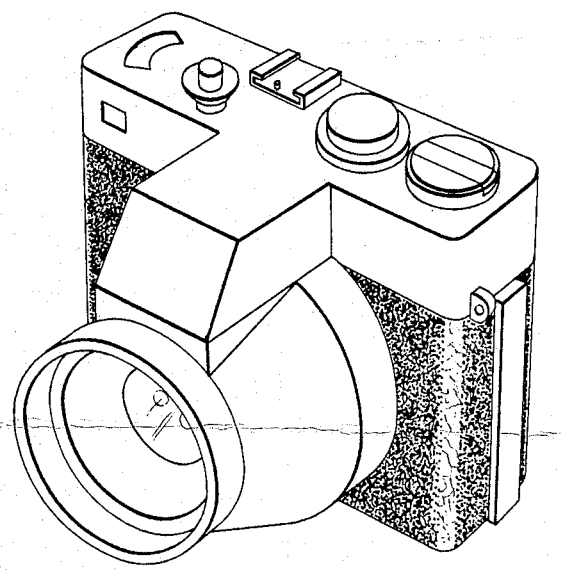
FIGURE 9A is a perspective view of a single-lens reflex camera according to the present invention.
Figure 9B:
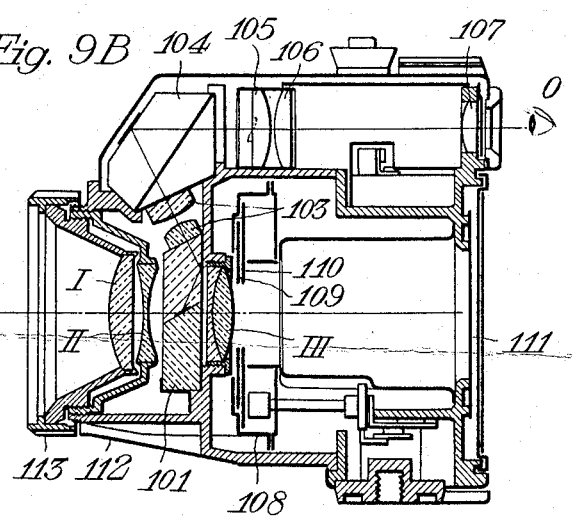
FIGURE 9B is a sectional view of the same.
Figure 9C:
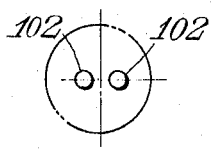
FIGURE 9C is a schematic elevation of a light separating prism in FIGURE 9B.

FIGURES 9A and 9B show an example of a perspective view and a vertically sectional structure including the optical axis respectively, of a 35 mm. size single-lens reflex camera to which the above-mentioned principle is applied. I, II and III are element members of a photographic lens corresponding to the first, second and third blocks of a Tesser type photographic lens, respectively. A light diverting prism 101 in which two small reflectors 102 are embedded is arranged between the second block II and the third block III. The first block I of said lens is fitted to a focal distance adjusting ring 113 provided in the front surface of a camera body 112. A lens shutter 108 integrally combining a diaphragm 109 and a shutter 110 is provided just behind the third block III of the lens and between it and a film surface 111. On the other hand, auxiliary lenses 103 are provided above the light diverting prism 101 or between it and a roof-shaped prism 104. A condenser 105 having a real image plane of such structure as is shown in FIGURES 4A to 8C, an ordinary condenser 106 and an eyepiece 107 are arranged on the same optical axis behind said roof-shaped prism 104 so as to form a finder optical system together with the auxiliary lenses 103 and the roof-shaped prism 104.

Now, the part of the light incident on the photographing lens which part is not diverted by the small reflectors 102 in the light separating prism 101 will pass through the third block III and further through the centers of the diaphragm 109 and shutter 110 and will focus an image on the film surface. On the other hand, the fine light beam reflected and separated by the small reflectors 102 will be once totally reflected within the light separating prism 101, will then pass through the auxiliary lenses 103, will be reflected by the roof-shaped prism 104, will once focus an image in the real plane of the condenser 105 and will then be incident on a pupil O through the eyepiece 107. As the small reflectors 102 are so designed as to form images on the pupil O by the condensers 105 and 106, the eyepiece 107 and the prismatic action of the condenser 105, when the size of the small reflectors 102 is properly selected, a very bright image will be able to be seen in the whole field of vision of the finder. The first block I of the lens can be advanced or retreated by rotating the adjusting ring 113 so that the image of an object at any distance may be brought to the film surface 111 and to the real image plane within the condenser 105. With such structure as is shown in FIGURES 4A to 8C as described above, focusing high in precision can be made within the finder.

In the optical system for the known single-lens reflex camera of this kind, unless the diaphragm is brought as near as possible to the small reflector, when the diaphragm aperture is made small, the brightness on the film surface will be likely to become irregular. Therefore, it has been necessary to insert an iris diaphragm between the light separating prism and the auxiliary lens.

However, if two small reflectors are used and the distance between them is made large enough, even if the diaphragm is arranged rather far away from the small reflectors, the brightness on the film surface will no become irregular.

Therefore, in the present embodiment, the diaphragm is provided behind the third block III of the lens and is integrally combined in the lens shutter 108.

Thus, the optical system of the photographic lens blocks I, II, III can be assembled and adjusted as a whole, the precision as of a photographic lens can be kept high and the price can be made advantageous. Further, as the diaphragm and the shutter can be combined integrally, it is very convenient to adopt an automatic exposing mechanism or a similar exposure meter operating mechanism.

What is claimed is:

1. A single lens reflex camera comprising a photographic objective having a large angle field of vision, a diaphragm in front of said objective, two small reflectors in front of said diaphragm and spaced from the optical axis of said camera, and an optical finder system adjacent said objective and diaphragm into which said reflectors reflect a portion of the light entering the camera, said optical finder system having a focusing panel in the real image plane of said finder system with two flat surfaces on the side thereof onto which the light from the reflectors is incident and having the other side spherical, said flat surfaces each being inclined at an angle to the optical axis of said finder system and to each other at an angle determined by the position of said two small reflectors, each surface having an extension extending into the other inclined surface past a line of intersections of said surfaces, said extensions having the edges thereof which are adjacent straight and lying in a plane which includes the optical axis of said finder system and is perpendicular to said surfaces.

2. A single-lens reflex camera as claimed in claim 1 in which the surfaces of the panel between the ends of the extensions and the respective inclined surfaces are flat and straight and extend parallel to the intersection line between the two inclined surface portions.

3. A single-lens reflex camera as claimed in claim 1 in which the extensions are quadrant shaped and have a dimension parallel to the intersection line of said surfaces less than the distance from said adjacent edges of said extensions to the edges of said panel, and the surfaces of the panel between the ends of the extensions and the respective inclined surfaces, portions are curved.

4. In a single lens reflex camera having a photographic objective having a large angle field of vision, a diaphragm in front of said objective, two small reflectors in front of said diaphragm and spaced from the optical axis of said camera, and an optical finder system adjacent said objective and diaphragm into which said reflectors reflect a portion of the light entering the camera, a focusing panel adapted to be positioned in the real image plane of said finder system, said focusing panel having two flat surfaces on the side thereof onto which the light from the reflectors is incident and having the other side spherical, said flat surfaces each being inclined at an angle to the optical axis of said finder system and to each other at an angle determined by the positions of said two small reflectors, each surface having an extension extending into the other inclined surface past a line of intersection of said surfaces, said extensions having the edges thereof which are adjacent straight and lying in a plane which includes the optical axis of said finder system and is perpendicular to said surfaces.

5. A single-lens reflex camera comprising a fixed transparent panel adjacent the diaphragm of the camera and having only two small reflectors therein at points spaced from the optical axis of the camera, and an optical finder system adjacent said transparent panel into which said reflectors reflect a small portion of the light admitted to the camera, said optical finder system having an eyepiece with a focusing panel on the side thereof opposite the viewing side and spherical viewing surface, said focusing panel being located in the real image plane of the finder optical system, said focusing panel having an upper portion extending for the full width of the eyepice and a lower portion extending for the full width of the eyepiece, and each portion having a plurality of wedge sections projecting therefrom, the wedge sections in the upper portion having inclined faces inclined in one direction and the wedge sections in the lower portion having inclined faces inclined in the opposite direction, and the angle of inclination $\alpha$ and the pitch P being such that the expression P tan $\alpha$ is less than the depth of focus in the finder optical system, whereby an image equivalent to the image focused on the surface of the film in the camera is observed in the field of vision of the eyepiece and at the same time alignment of the portions of the image seen in the portions of the surfaces inclined in one direction with the portion of the image seen in the remainder of the surfaces inclined in the other direction provides means for precise focusing.

6. A single-lens reflex camera comprising a fixed transparent panel adjacent the diaphragm of the camera and having only two small reflectors therein at points spaced from the optical axis of the camera, and an optical finder system adjacent said transparent panel into which said reflectors reflect a small portion of the light admitted to the camera, said optical finder system having an eyepiece with a focusing panel on the side thereof opposite the viewing side and a spherical viewing surface, said focusing panel being located in the real image plane of the finder optical system, said focusing panel having two inclined surface portions in the center thereof extending for only a small distance of the width of the panel with one surface portion inclined in the opposite direction to the other surface portion, and said panel further having a plurality of triangular projections thereon extending transversely to the width of the panel and having side surfaces with an inclination $\alpha$ and the projections having a pitch P such that the expression $P/2 \tan \alpha$ is less than the depth of focus in the finder optical system, whereby an image equivalent to the image focused on the surface of the film in the field of vision of the eyepiece and at the same time alignment of the portions of the image seen in the portions of the surfaces inclined in one direction with the portion of the image seen in the other direction provides means for precise focusing.

References Cited by the Examiner

UNITED STATES PATENTS

| 2,881,686 | 4/1959 | Ruhle | 95—44 |
| 2,909,109 | 10/1959 | Back | 95—42 |
| 3,003,407 | 10/1961 | Grey | 95—44 |
| 3,006,262 | 10/1961 | MacMillin | 95—44 |

FOREIGN PATENTS 1,108,066  5/1961  Germany.

OTHER REFERENCES

German application Serial No. 1,083,119, Rodenstock, June 1960.

JOHN M. HORAN, *Primary Examiner.*

EVON C. BLUNK, NORTON ANSHER, L. J. BOVASSO, *Assistant Examiners.*